J. ARCHER & G. CLARK.
JACK FOR AUTOMOBILES AND THE LIKE.
APPLICATION FILED APR. 18, 1916.
1,262,297.
Patented Apr. 9, 1918.
2 SHEETS—SHEET 1.
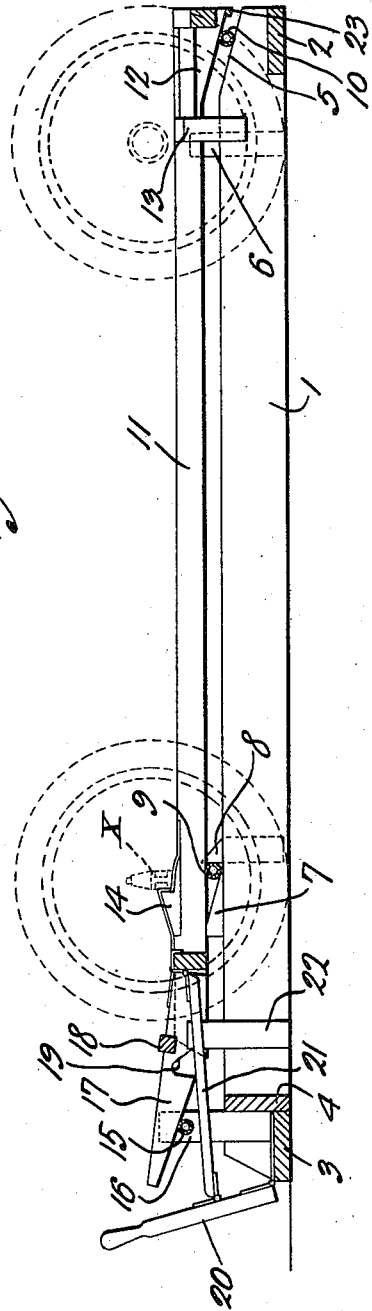
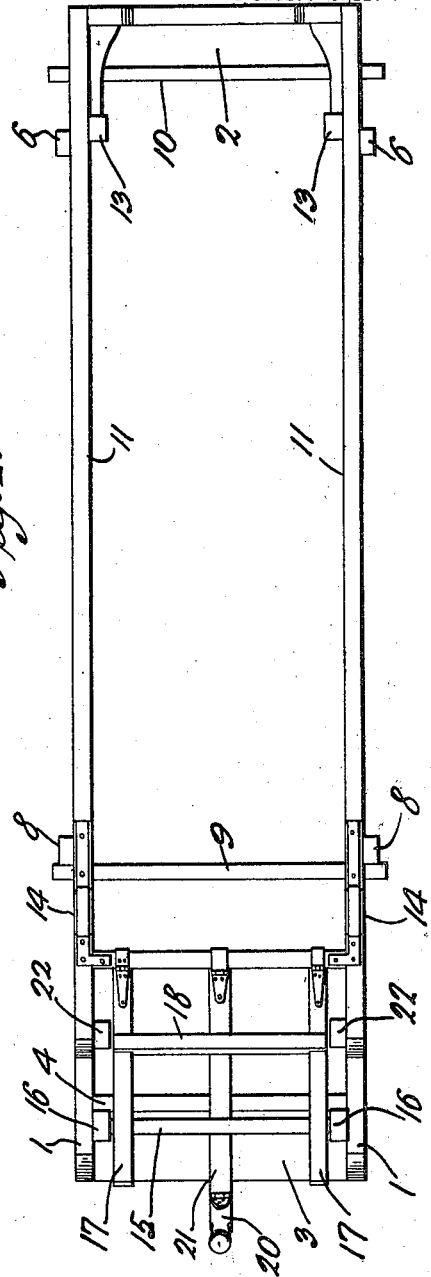
J. Archer and
G. Clark Inventors
by C. A. Snow & Co.
Attorneys
Witnesses J. ARCHER & G. CLARK.
JACK FOR AUTOMOBILES AND THE LIKE.
APPLICATION FILED APR. 18, 1916.
1,262,297.
Patented Apr. 9, 1918.
2 SHEETS—SHEET 2.
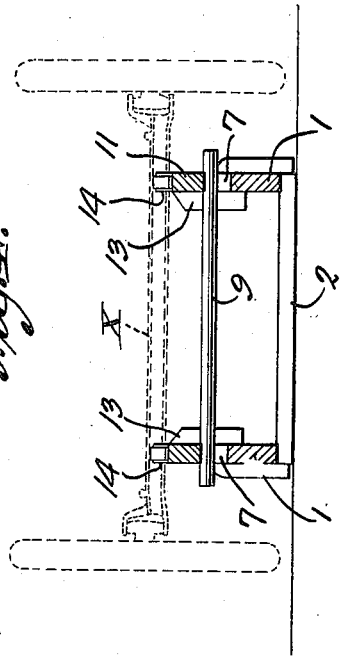
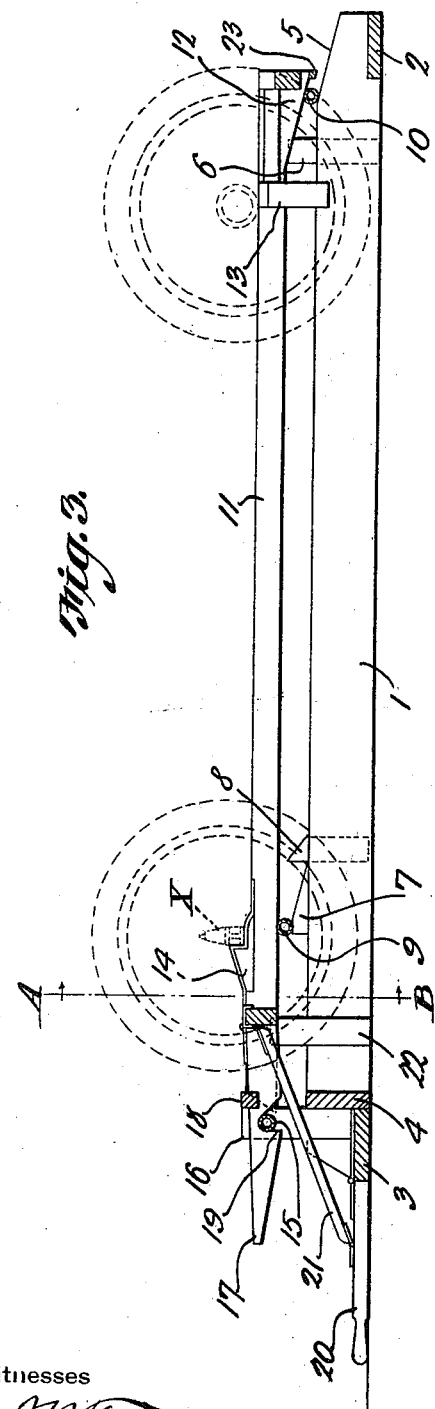
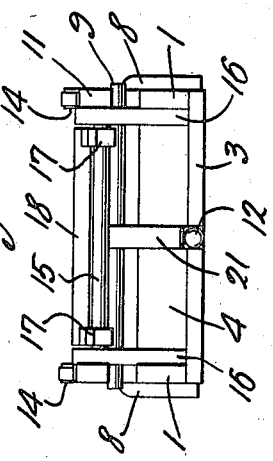
Witnesses
J. Archer and
G. Clark Inventors
by
Attorneys

UNITED STATES PATENT OFFICE.

JOHN ARCHER AND GEORGE CLARK, OF CLINTON, INDIANA.

JACK FOR AUTOMOBILES AND THE LIKE.

1,262,297.    Specification of Letters Patent.    Patented Apr. 9, 1918.

Application filed April 18, 1916. Serial No. 91,984.

*To all whom it may concern:*

Be it known that we, JOHN ARCHER and GEORGE CLARK, citizens of the United States, residing at Clinton, in the county of Vermilion, State of Indiana, have invented a new and useful Jack for Automobiles and the like, of which the following is a specification.

This invention relates to jacks for supporting automobiles and the like with their wheels out of contact with the ground.

One of the objects of the invention is to provide a simple form of jack which will be operated by the impact of a vehicle thereagainst to automatically lift the vehicle from the ground and to hold it in its elevated position until it is desired to lower it, means being employed for locking the parts against movement when the vehicle is elevated.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a central vertical longitudinal section through the jack and showing the parts in their normal positions prior to the elevation of a vehicle.

Fig. 2 is a plan view.

Fig. 3 is a view similar to Fig. 1 and showing the relative positions of the parts while a vehicle is being supported out of contact with the ground.

Fig. 4 is a section on line A—B Fig. 3.

Fig. 5 is an end elevation of the structure with the parts in the positions shown in Fig. 3.

Referring to the figures by characters of reference 1 designates the side boards of the base frame, these boards being placed on edge and being connected at their ends by cross strips 2 and 3 respectively, one or more upstanding reinforcing strips 4 being employed. The corners of the side boards above the cross strip 2 are cut away to form inclines 5 and upstanding from the side boards near the upper ends of the inclines 5 are stop posts 6.

Blocks 7 having inclined upper edges are secured upon the side boards 1, the said inclined upper edges being substantially parallel with the inclines 5. Stop posts 8 are provided at the lower ends of the inclined blocks 7.

Resting on the blocks 7 is a roller 9 which can be formed of a length of gas pipe and which projects at its ends beyond the side boards 1. Another similar roller 10 is mounted on the inclines 5. Supported by the rollers 9 and 10 is a movable frame 11 the front portion of which rests on the roller 9 while blocks 12 having downwardly and rearwardly inclined lower edges are secured to the rear portion of this frame 11 and bear on the roller 10. Retaining strips 13 are secured to the sides of frame 11 close to the blocks 12 and lap the side boards 1 so as to hold frame 11 against lateral displacement relative to said side boards. Lugs 14 extend upwardly from the sides of frame 11 near the front end thereof, preferably directly above the roller 9 and are of such size that when the frame 11 is in its lowermost position with roller 9 bearing against the stop post 8, the front axle X of a vehicle moving on to the jack will come against said lugs as shown by dotted lines in Fig. 1.

A cross rod 15 is supported above the cross strip 3 by posts 16 and hingedly connected to the front end of the movable frame 11 are latch strips 17 which may be connected by a cross strip 18. These latch strips have notches 19 designed to receive the cross bar 15 and hold the frame 11 against backward movement after said frame has been moved longitudinally a predetermined distance in one direction.

A lever 20 is hingedly connected to the cross strip 3 and is connected by a link 21 to the front end of the frame 11. Guide posts 22 extend upwardly from the side boards 1 and lap the front end portion of the frame 11.

Under normal conditions the lever 20 is elevated and the latch members 17 are disengaged from the rod 15 while the roller 9 engages the stop posts 8 and roller 10 is interposed between the rear portions of the inclines 5 and the blocks 12. It might be stated that if desired any suitable retaining means, such as a cross strip 23 may be employed for holding the roller 10 in position between the inclines 5 and the blocks 12.

When an automobile or the like is driven onto the jack with the wheels extending at opposite sides thereof, the front axle X of the vehicle will come against the lugs or ears 14 and the impact will be sufficient to force frame 11 longitudinally and cause the roller 9 to travel up the blocks 7 and the roller 10 to travel upwardly along the inclines 5. The momentum imparted will be sufficient to move the frame 11 upwardly such a distance that the latch members 17 will engage the cross rod 15 with the result that frame 11 will be locked in elevated position and the vehicle will be supported out of contact with the ground. During this movement of frame 11 lever 20 will be swung downwardly onto the ground. The roller 9 will move upwardly onto the horizontal upper end portions of the blocks 7, while roller 10 will move upwardly onto the horizontal upper edge portions of the side boards 1. When it is desired to lower the vehicle onto the ground, the latch members 17 are lifted out of engagement with bar 15, whereupon lever 20 is swung upwardly and backwardly and will thrust, through link 21, against frame 11 and force it rearwardly, thereby causing the rollers 9 and 10 to move downwardly to their normal positions and gradually bring the vehicle in position on the ground.

It will be seen that the entire structure can be cheaply manufactured and will be simple in construction and efficient in operation.

What is claimed is:—

A jack, comprising a base frame having inclined ends, rollers extending transversely of the frame and supported on the inclines, a movable frame having an inclined end opposed to an inclined end of the main frame mounted on the rollers; posts secured to and rising from the sides of the main frame and adapted to embrace and guide the movable frame and limit the movement of the rollers, means on the movable frame for contacting a vehicle axle, coöperating means on the two frames for holding the movable frame in its elevated position, a lever connected to one of the frames, and a connection between the lever and the other frame for shifting the movable frame out of its raised position when released.

In testimony that we claim the foregoing as our own, we have hereto affixed our signatures in the presence of two witnesses.

JOHN ARCHER.
GEORGE CLARK.

Witnesses:
BERT CLARK,
CAL HAMERSLEY.

Copies of this patent may be obtained for five cents each, by addressing the "Commissioner of Patents, Washington, D. C."